United States Patent [19]

Ashley et al.

[11] Patent Number: 5,704,734
[45] Date of Patent: Jan. 6, 1998

[54] METAL CUTTING TOOL ASSEMBLY HAVING AND AUTOMATICALLY ADJUSTABLE CHIPBREAKER

[75] Inventors: John P. Ashley, Kinver, United Kingdom; Kenneth L. Niebauer, Raleigh, N.C.

[73] Assignee: Kennametal Inc., Latrobe, Pa.

[21] Appl. No.: 669,035

[22] Filed: Jun. 24, 1996

Related U.S. Application Data

[62] Division of Ser. No. 141,310, Oct. 22, 1993, Pat. No. 5,538,367.

[51] Int. Cl.$^6$ ............................................. B32B 27/22
[52] U.S. Cl. ........................ 407/3; 407/6; 407/10
[58] Field of Search ........................ 407/3, 2, 6, 100, 407/115, 4, 5

[56] References Cited

U.S. PATENT DOCUMENTS

| | | | |
|---|---|---|---|
| 2,173,772 | 9/1939 | Timmons | 407/3 |
| 2,799,079 | 7/1957 | Brigner | 407/5 |
| 2,860,402 | 11/1958 | Proksa | 407/3 X |
| 3,028,657 | 4/1962 | Almen | 407/6 |
| 3,191,262 | 6/1965 | Gustafson | 407/4 |
| 3,518,737 | 7/1970 | Hood | 29/96 |
| 4,277,206 | 7/1981 | Hilton | 407/3 |
| 4,400,116 | 8/1983 | Buchmann et al. | 407/3 |
| 4,414,870 | 11/1983 | Peterson, Jr. et al. | 407/100 X |
| 4,786,217 | 11/1988 | Johne | 408/156 |
| 5,122,017 | 6/1992 | Niebauer | 407/114 |
| 5,147,157 | 9/1992 | Pawlik | 407/36 |

FOREIGN PATENT DOCUMENTS

| | | | |
|---|---|---|---|
| 1271691 | 8/1961 | France. | |
| 2043605 | 3/1972 | Germany. | |
| 139242 | 4/1930 | Switzerland | 407/3 |
| 0837574 | 6/1981 | U.S.S.R. | 407/100 |
| 1266663 | 10/1986 | U.S.S.R. | 407/6 |
| 835729 | 5/1960 | United Kingdom | 407/3 |

OTHER PUBLICATIONS

International Search Report Mailed Jan. 30, 1995 for International Application PCT/US94/10921.
Gettelman, K.M., Editor-In-Chief, "Bye Bye Birds' Nests," Modern Machine Shop, Sep., 1991.
Hongtau, Zhang et al., "The Theoretical Calculation Of Naturally Curling Radius Of Chip," Int. J. Mach. Tools Manufact., vol. 29, No. 3, 1989, pp. 323–332.
Bater, James S., "Power Reduction Through Efficient Chip Control," Cutting Tool Eng., Jul./Aug. 1975, pp. 4–8, 54.

*Primary Examiner*—Daniel W. Howell
*Assistant Examiner*—Henry W. H. Tsai
*Attorney, Agent, or Firm*—John J. Prizzi

[57] ABSTRACT

A metal cutting tool assembly (1) having an automatically adjustable chipbreaker (23) is provided that comprises a cutting insert (11) for cutting a relatively rotating workpiece, a holder (3) for holding the insert (11), an insert driver (5) for applying a cutting force between the insert (11) and the workpiece, a chipbreaker (23) having a surface (27) that is effective in breaking chips (55, 56) of different thicknesses when positioned at different distances from the cutting edge (19) of the insert (11), and a mounting mechanism (30) for movably mounting the chipbreaker (23) onto the holder (3). The mounting mechanism (30) includes a spring (50) for automatically adjusting the distance between the chipbreaking surface (27) of the chipbreaker (23) and the cutting edge (19) of the insert (11) in response to the forces applied to the chipbreaker (23) by the metal chips (55, 56) that result from the cutting operation. The mounting mechanism (30) may allow the chipbreaker (23) to either slidably reciprocate on the holder (3) toward and away from the cutting edge (19), or to pivotally move with respect to the cutting edge (19). In both cases, the deflection of the spring (50) is proportional to the thickness of the metal chips (55, 56) engaging the chipbreaking surface (27), which in turn automatically provides the appropriate chipbreaking geometry. The inventive tool assembly allows the same chipbreaker (23) to effectively break chips (55, 56) of widely varying thicknesses which are created when the cutting insert (11) is used to make a variety of different types of cuts in a machining operation.

10 Claims, 8 Drawing Sheets

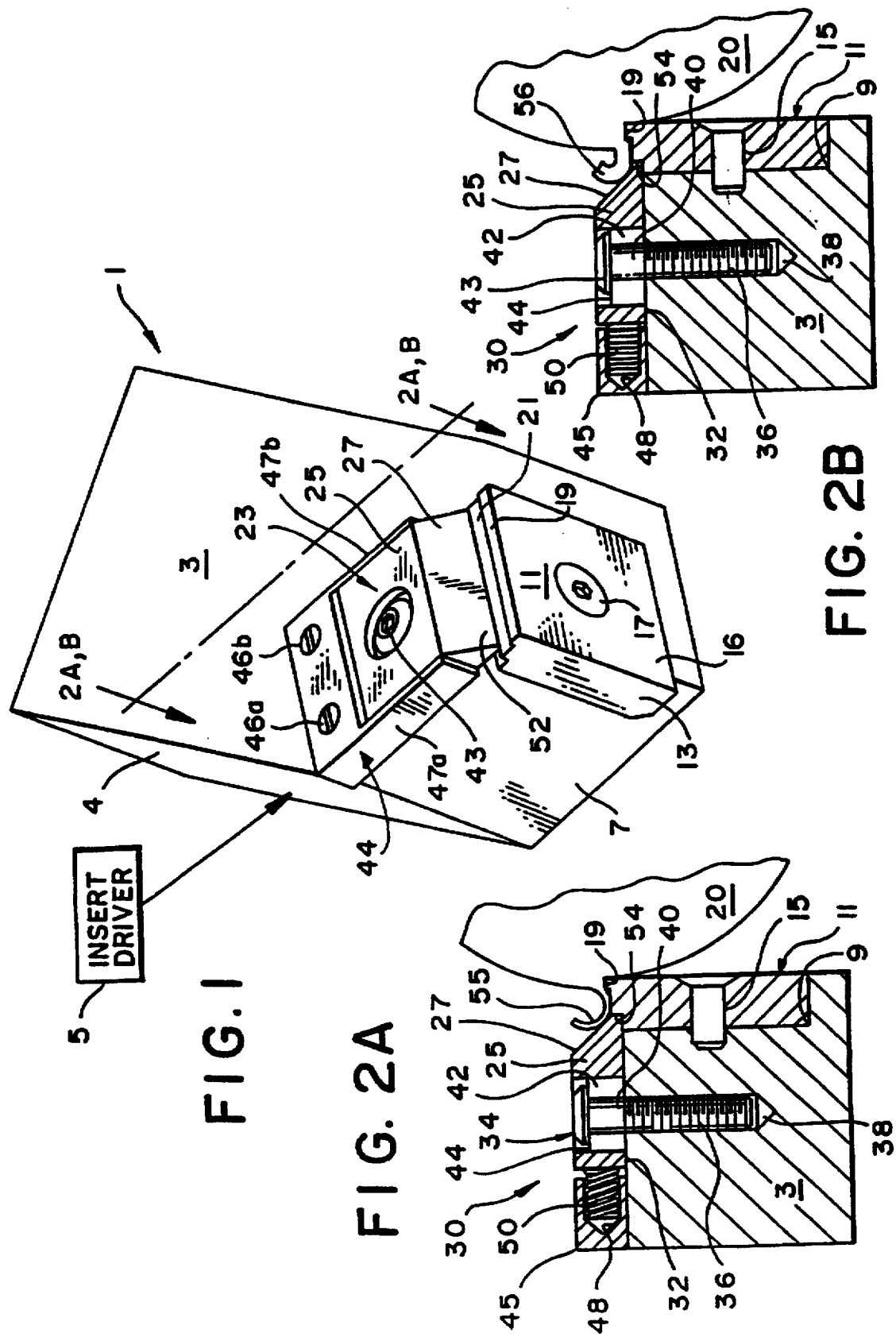

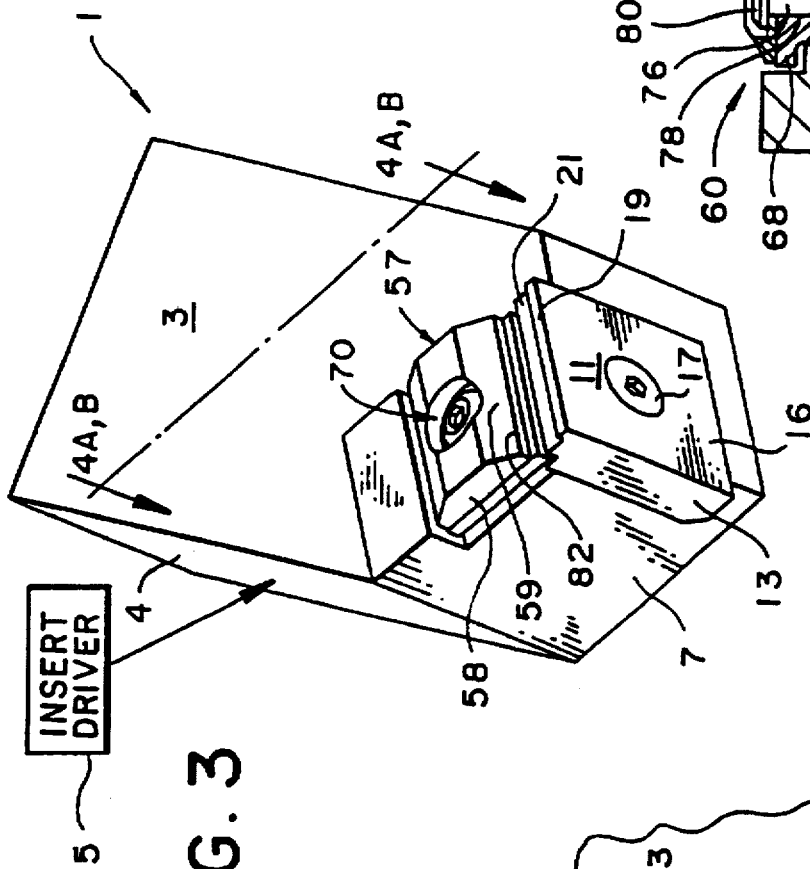

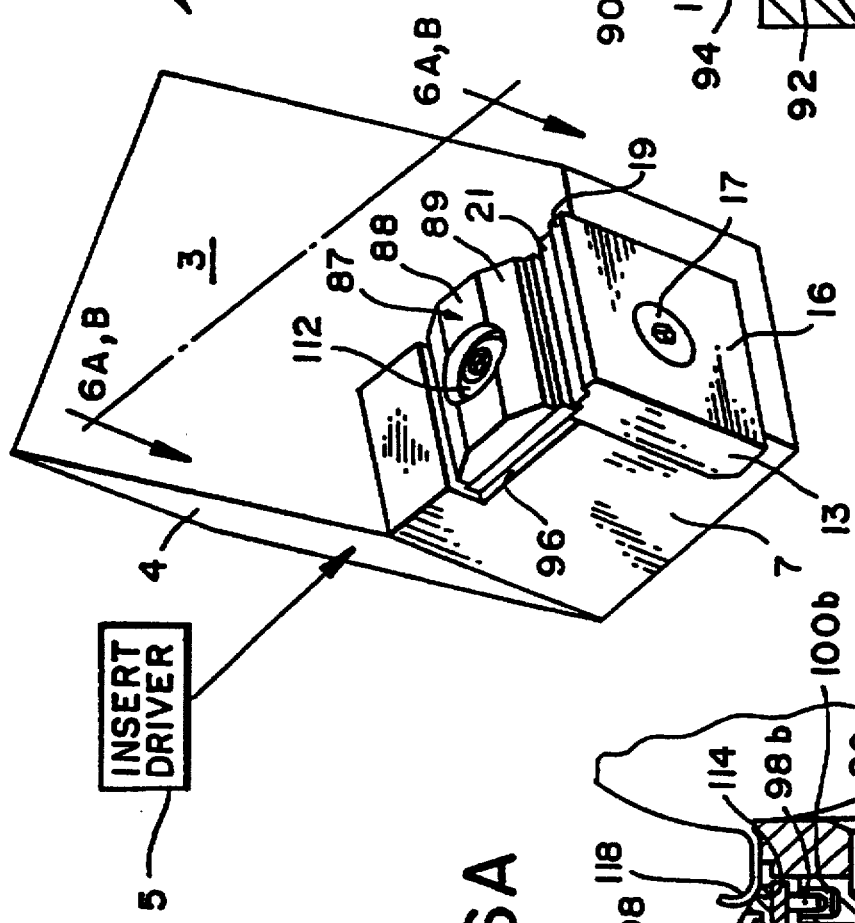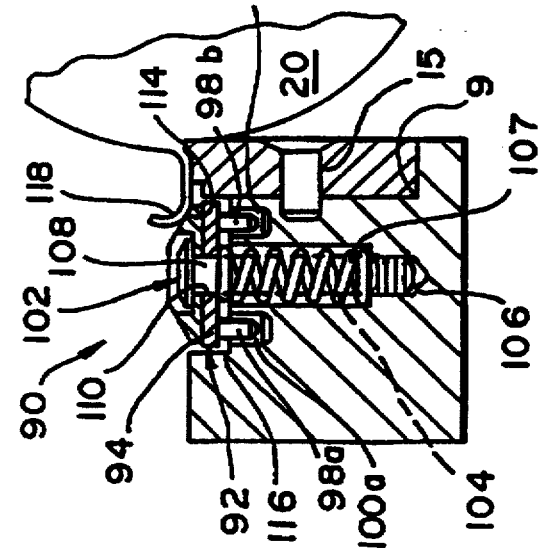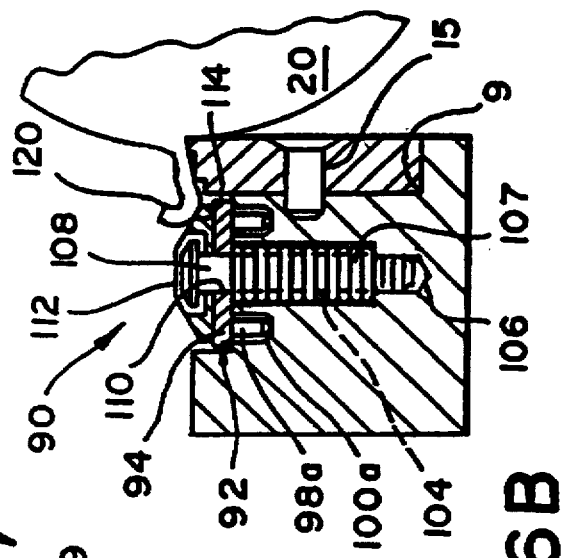

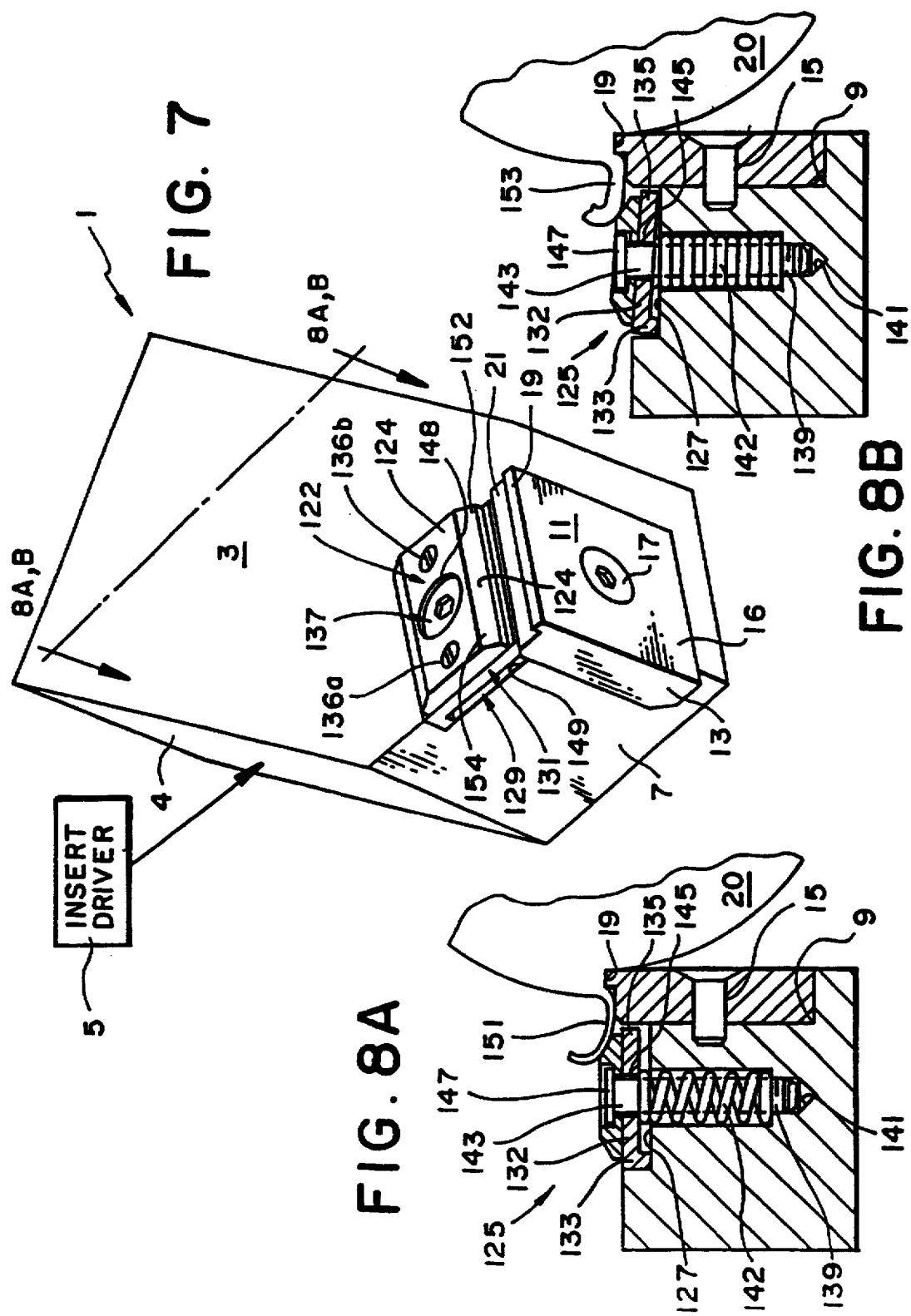

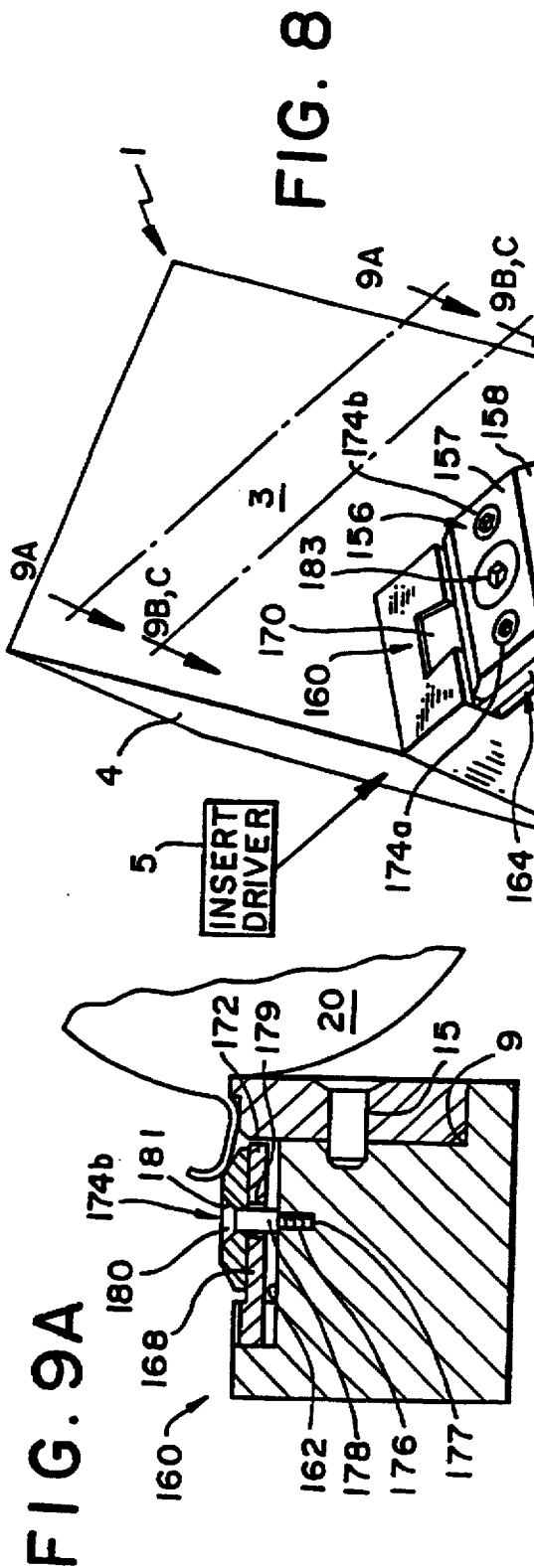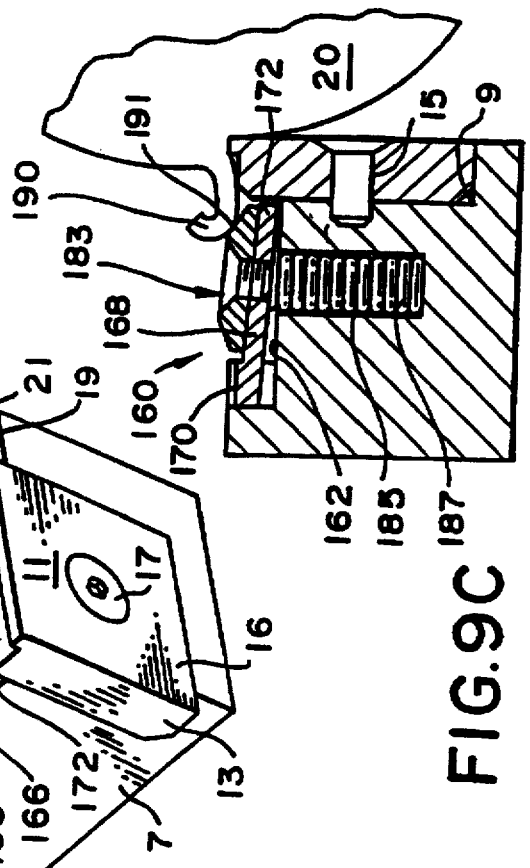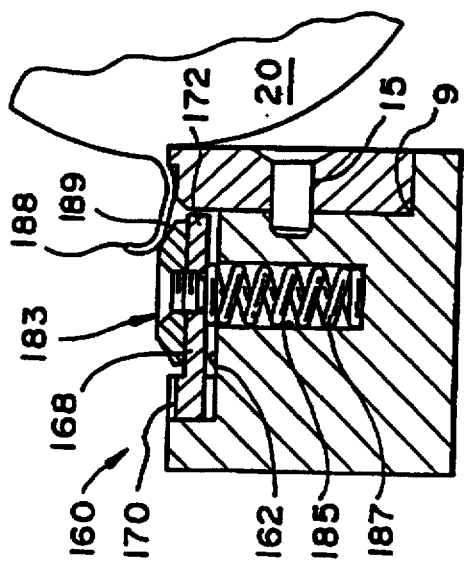

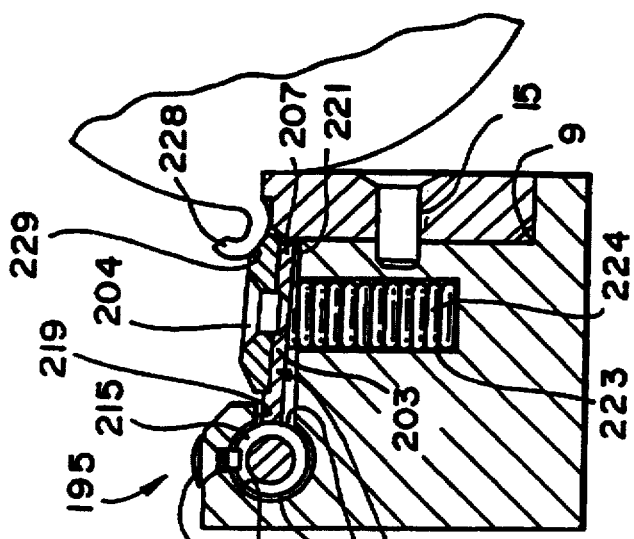
FIG. 10
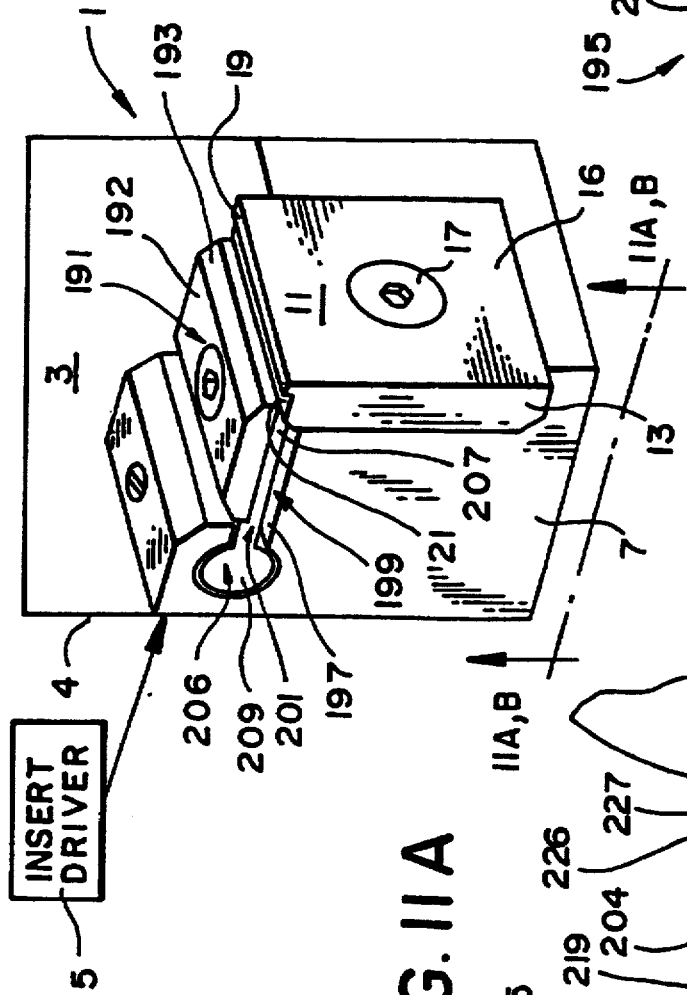
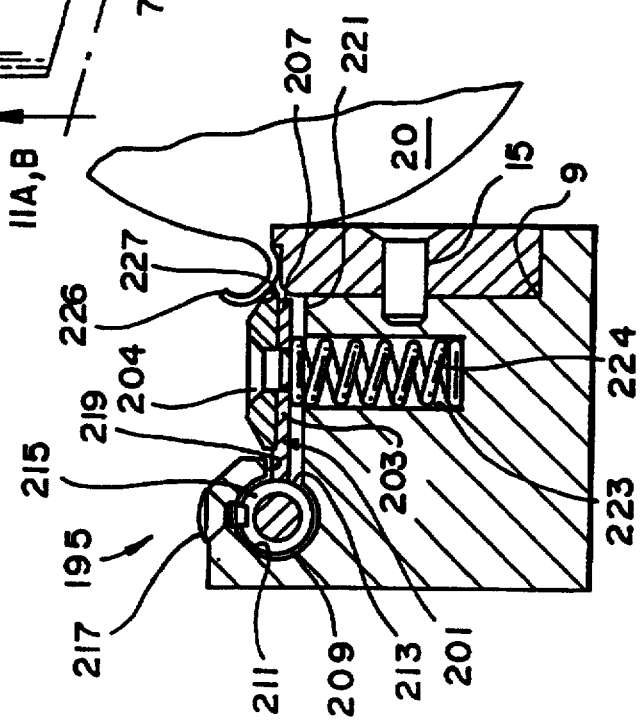

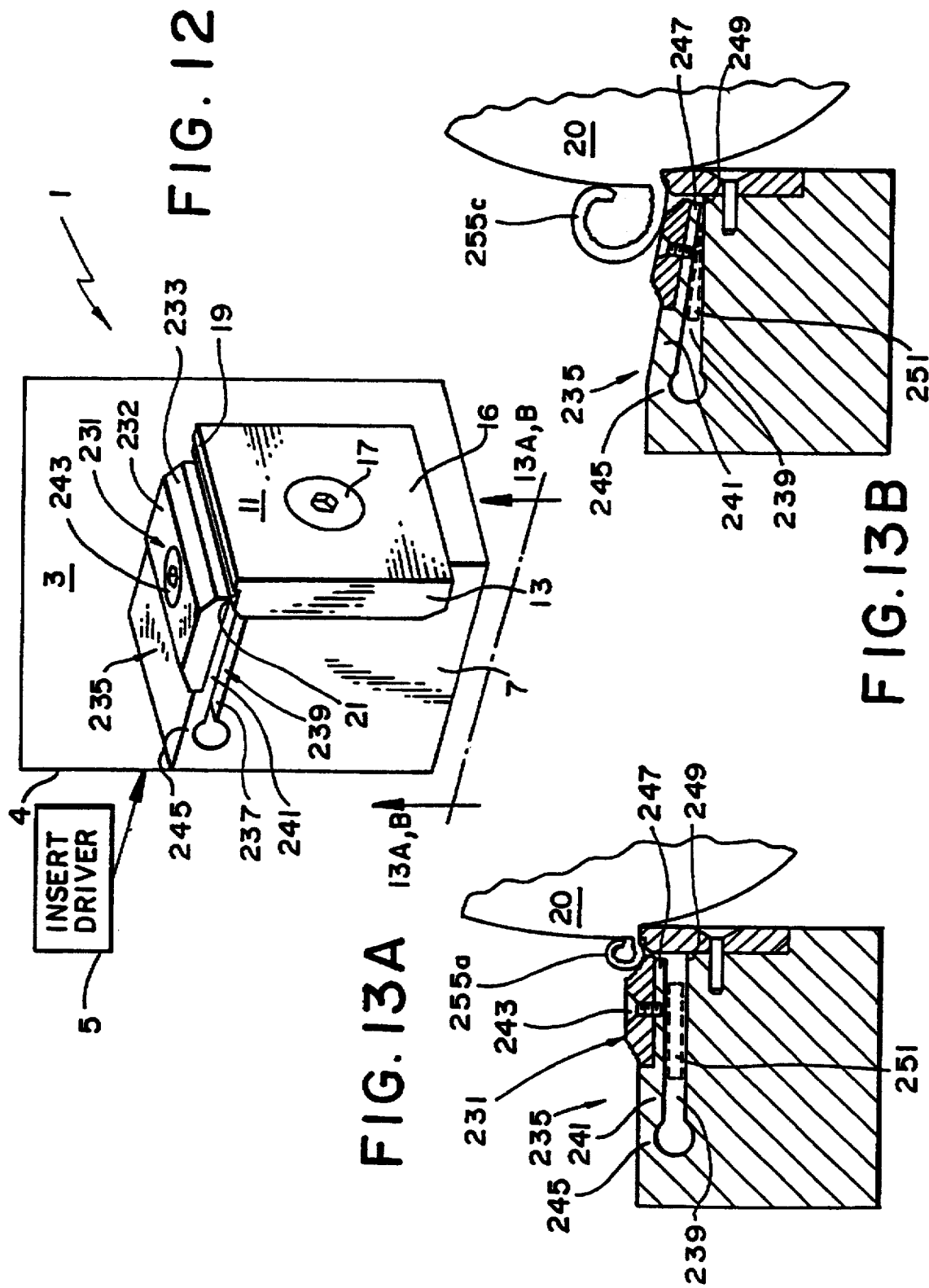

mechanisms that automatically adjusts itself to effectively
METAL CUTTING TOOL ASSEMBLY HAVING AND AUTOMATICALLY ADJUSTABLE CHIPBREAKER This is a Divisional application of Ser. No. 08/141,310, filed Oct. 22, 1993 now U.S. Pat. No. 5,538,367.

BACKGROUND OF THE INVENTION

This invention generally relates to metal cutting tools, and is specifically concerned with a tool assembly comprising the combination of a metal cutting insert, and a chipbreaker mechanism that automatically adjusts itself to effectively break metal chips of widely differing thicknesses that result from the metal cutting operation.

Metal cutting tool assemblies utilizing a metal cutting insert in combination with a chipbreaker are known in the prior art. The inserts are typically formed from very hard, wear resistant materials such as refractory coated cemented carbide materials. While such inserts may assume any one of a number of differing geometrical shapes, they all have at least one cutting edge for engaging and cutting a metal workpiece. In operation, the cutting insert is detachably mounted on the end of a tool holder, and its cutting edge is forcefully engaged against a metal workpiece that is rotated relative to the workpiece by a machine tool such as a lathe. As the cutting edge of the insert cuts the metal workpiece, a long streamer of metal, known in the art as a "chip," is created that slides across the cutting edge of the insert. If no means for breaking such chips into short segments is provided, the chips might coil beyond the physical boundaries of the machine tool or wrap around the workpiece and machine tool, damaging one or the other. In view of this, chipbreaking mechanisms were developed in the prior art to break such chips into short manageable lengths of under two inches.

Prior art chipbreakers fall into two general categories, including (1) chipbreakers that are mechanically separable from the cutting insert mounted on the tool holder, and (2) chipbreakers which are integrally formed as part of the insert itself. In instances where the chipbreaker is mechanically separate from the insert, the chipbreaker may provide a single groove or trough-shaped surface directly behind the cutting edge of the insert. In operation, the metal chip is deflected from the cutting surface of the insert into the surface defined by the groove of the chipbreaker, which in turn causes the chip to curl back toward the workpiece. Because the curling of the metal chip work-hardens it and causes it to become embrittled, the chip breaks shortly after curling. In some instances, the chip curls back onto the surface of the workpiece and then breaks. Under these circumstances, however, the insert design and orientation is such that the chip is directed toward a portion of the workpiece ahead of the insert such that the already machined surface is not marred by contact with the chip. Chipbreakers that are integrally formed into the cutting inserts themselves work on approximately the same principle. The chipbreaking surface of an integrally formed chipbreaker may include a first surface which tapers down from the cutting edge which is called a land angle trailing wall, a second flat surface that connects with the bottom trailing edge of the first wall known as the chip groove floor, and a third surface known as the back wall which tapers upwardly from the trailing edge of the chip groove floor.

One of the shortcomings associated with either type of chipbreaker is that the groove or trough that defines the chipbreaking surface is limited in the thicknesses of chips that it can effectively break. When the cutting insert is used to make finishing cuts on a metal workpiece, the resulting metal chips are thin and foil-like, and the groove or trough which defines the chipbreaking surface must define a relatively tight curvature for such thin chips to be effectively curled, work hardened, and broken. While such a tight-curvatured groove might be able to break chips of intermediate thickness, the excessive heat created on the groove as a result of the larger amounts of friction between the thicker chips and the specific points of the groove surface that engage these chips can cause localized melting to occur on the chipbreaker surface, which ultimately leads to cratering. Such a condition is known in the art as over-controlled chipbreaking, and should be avoided as it creates excessive wear and tear on the chipbreaker surface. If progressively thicker cuts are made with a chipbreaker intended to be used in conjunction with only finishing cuts, at some point the chips will become so thick that they simply slide completely over the trough defined by the chipbreaking surface, and are not effectively broken at all. Such a condition is known in the art as under-controlled chipbreaking. Even if the chipbreaking groove or trough is dimensioned to effectively break a fairly wide range of chips having intermediate thicknesses, no static groove or trough geometry has yet been developed which is capable of breaking the complete range of thin and thick metal chips created as a result of different cutting depths.

While it is possible to change the chipbreaker used in conjunction with a particular cutting insert to break up chips which are substantially thicker or thinner than the chips previously produced, the downtime of the cutting tool associated with changing a separable chipbreaker results in expensive losses in productivity, and is an inconvenience and burden on the tool operator. Of course, in the case where the chipbreaker is integrally formed in the insert itself, the insert must be replaced every time the tool operator must make cuts of a significantly different depth in the rotating workpiece. This likewise leads to unproductive downtime, and essentially the same amount of inconvenience and burden on the tool operator. These limitations of prior art chipbreakers are particularly troublesome in machining operations for low carbon steel, where the chip thicknesses can vary widely.

Clearly, what is needed is a metal cutting tool assembly having a chipbreaker which is capable of breaking metal chips having a broader range of thicknesses than has been accomplished heretofore in the prior art. Ideally, such a chipbreaker mechanism should be simple in construction, and readily adaptable for use with existing turret blocks or spindles in machine tools. Finally, such a chipbreaker should be capable of breaking up a wide variety of chips having different thicknesses without either under-control of the resulting chips (i.e., allowing the chips to attain lengths of over 2 inches), or over-control which would apply such a powerful bending force on the chips that excessive crater-forming frictional heat is generated on the chipbreaker surface.

SUMMARY OF THE INVENTION

Generally speaking, the invention is an improved metal cutting tool assembly having an automatically adjustable chipbreaker that overcomes the aforementioned shortcomings of the prior art. The invention generally comprises a metal cutting tool of the type including a toolholder, and a cutting insert mounted therein for cutting a relatively rotating workpiece during a machining operation, where the improvement comprises an automatically adjustable chipbreaker for breaking metal chips of widely differing thicknesses created when the insert makes cuts of different depths on the workpiece. The invention includes a mounting mechanism for movably mounting the chipbreaker onto the toolholder which includes a resilient member, such as a coil or leaf spring, for automatically adjusting the distance of the chipbreaker surface with respect to the cutting edge of the insert in response to the thickness of the chips produced by the insert. Chips of different thicknesses apply different forces onto to the chipbreaker, and the resilient member deflects in proportion to the amount of force that the chips apply to the chipbreaker in order to move the chipbreaking surface farther away from the cutting edge of the insert for thicker chips, and closer to the cutting edge of the insert for thinner chips, thus appropriately varying the length of the chipbreaking groove defined by the surfaces of the insert and chipbreaker.

In one embodiment of the invention, the mounting mechanism slidably and reciprocally mounts the chipbreaker onto the holder, such that the chipbreaking surface is horizontally movable with respect to the cutting edge of the insert in a direction parallel to the direction that the chips slide off of the insert. In a second embodiment, the mechanism slidably mounts the chipbreaker onto the toolholder such that the chipbreaking surface reciprocally moves vertically with respect to the direction to the direction that the chips slide off of the insert. In both embodiments, the resilient member (which may be a coil spring having linear compression characteristics) biases the chipbreaker toward the insert.

In other embodiments of the invention, the first end of the chipbreaker may be either pivotally movable with respect to the toolholder by way of a fulcrum member, or pivotally mounted onto the, tool holder by means of a dovetail mechanism. The extent of angular movement of the second end of the chipbreaker with respect to the cutting edge of the insert may be defined between a stop screw and an opposing surface of the toolholder. In another embodiment of the invention, the first end of the chipbreaker may be pivotally mounted to the holder by means of a shaft attached to the chipbreaker which pivots within a bore present in the holder much like a common hinge. The holder may include a slot disposed parallel to the axis of the bore for freely allowing the insertion of the shaft affixed to the chipbreaker. In this embodiment, pivotal movement of the second end of the chipbreaker may be limited by the width of the slot in the bore that receives the shaft that is secured to the first end of the chipbreaker.

In a final embodiment of the invention, the resilient member of the mounting means includes a leaf spring cantilevered onto the holder at one end and supporting the chipbreaker at another end. The resilient member may further include an elastomeric foam disposed between the chipbreaker and the holder for stiffening and reinforcing the leaf spring that cantileverly mounts a chipbreaker to the holder. In this embodiment of the invention, the chipbreaking surface may include separate portions for engaging and breaking chips of small, medium and large thicknesses respectively, and the engagement forces applied to the chipbreaking surface by such chips may angularly deflect the leaf spring such that small, medium and large thickness chips engage their respective portions of the chipbreaking surface.

All of the embodiments of the invention are capable of automatically and effectively breaking chips over a wide range of chip thicknesses without the need for changing the chipbreaker of the cutting tool assembly.

BRIEF DESCRIPTION OF THE SEVERAL FIGURES

FIG. 1 is a partial perspective view of one embodiment of the improved metal cutting tool assembly of the invention which comprises a mounting mechanism that allows the chipbreaker to slidably move over a top surface of the tool holder during a machining operation;

FIGS. 2A and 2B are side, cross-sectional views of the tool assembly illustrated in FIG. 1 along the lines 2A,B—2A,B illustrating the extent to which thinner and thicker metal chips push the chipbreaking surface of the chipbreaker away from the cutting edge of the insert, respectively, thereby adjusting the chipbreaking groove;

FIG. 3 is a partial perspective view of a second embodiment of the metal cutting tool assembly of the invention, illustrating a mounting mechanism that allows the chipbreaker to resiliently and reciprocally move vertically within a recess in the tool holder;

FIG. 4A and 4B are cross-sectional side views of the metal cutting tool assembly illustrated in FIG. 3 along the lines 4A,B—4A,B, illustrating the extent to which thinner and thicker metal chips push the chipbreaker downwardly into the tool holder, thereby adjusting the chipbreaking groove;

FIG. 5 is a partial perspective view of a third embodiment of the metal cutting tool assembly of the invention, illustrating a mounting mechanism, which, like the second embodiment, allows the chipbreaker to reciprocally and resiliently move vertically within recesses in the tool holder;

FIGS. 6A and 6B are cross-sectional side views of the metal cutting tool assembly of FIG. 5 along the lines 6A,B—6A,B, illustrating the extent to which the forces applied by thinner and thicker chips to the surface of the chipbreaker depresses the chipbreaker into the tool holder, thereby adjusting the chipbreaking groove;

FIG. 7 is a partial perspective view of a fourth embodiment of the metal cutting tool assembly of the invention, illustrating another mounting mechanism that allows the chipbreaker to move pivotally with respect to the tool holder;

FIGS. 8A and 8B are cross-sectional side views of the tool assembly of FIG. 7 taken along the lines 8A,B—8A,B, illustrating how the forces applied to the surface of the chipbreaker by thinner and thicker chips cause the chipbreaker to pivot downward to different extents, thereby adjusting the chipbreaking groove;

FIG. 8 is a partial perspective view of a fifth embodiment of the metal cutting tool assembly of the invention, illustrating still another mounting mechanism that allows the chipbreaker to move pivotally with respect to the toolholder;

FIG. 9A is a side cross-sectional view of the tool assembly illustrated in FIG. 8 along the lines 9A—9A, illustrating the structure of the retainer screw of the mounting mechanism;

FIGS. 9B and 9C are side cross-sectional views of the metal cutting tool assembly illustrated in FIG. 8 along the lines 9B,C—9B,C, illustrating how thinner and thicker metal chips apply forces to the surface of the chipbreaker that pivot the chipbreaker downwardly to different extents, thereby adjusting the chipbreaking groove;

FIG. 10 is a partial perspective view of a fifth embodiment of the invention, illustrating still another mounting mechanism that allows the chipbreaker to move pivotally with respect to the tool holder;

FIGS. 11A and 11B are side cross-sectional views of the metal cutting tool assembly of FIG. 10, illustrating how thinner and thicker metal chips apply different forces to the surface of the chipbreaker that causes the chipbreaker to pivot downwardly to lesser or greater extent, thereby adjusting the chipbreaking groove;

FIG. 12 is a partial perspective view of a seventh embodiment of the invention, illustrating still another type of mounting mechanism that allows the chipbreaker to move pivotally with respect to the tool holder;

Figure 14A:
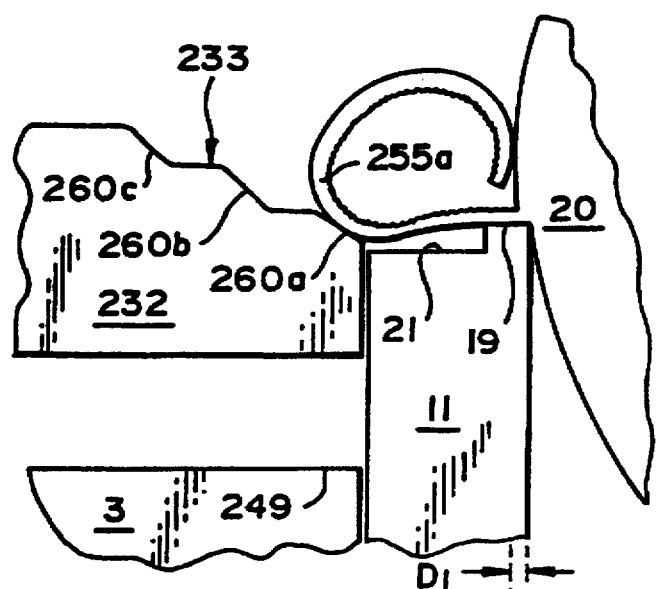
Figure 14B:
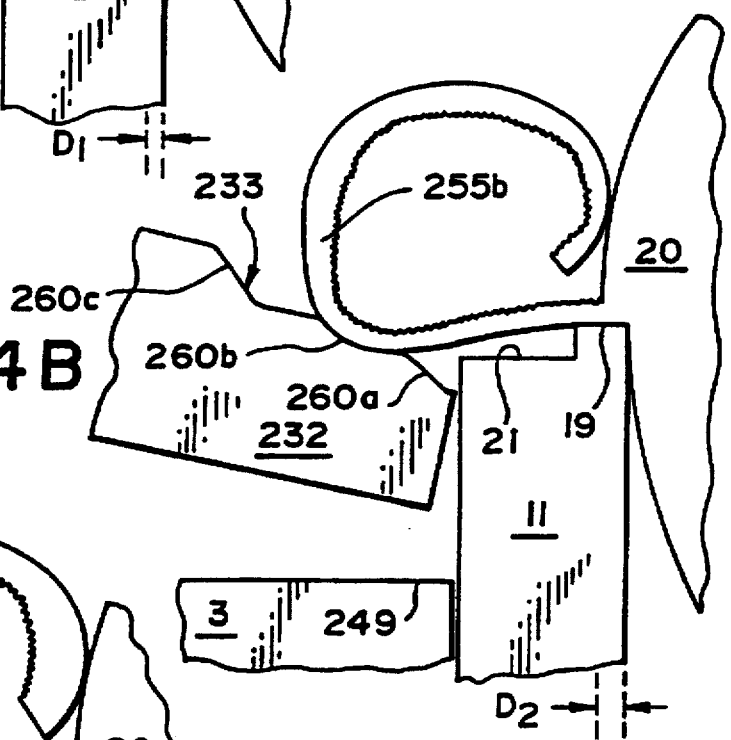
Figure 14C:
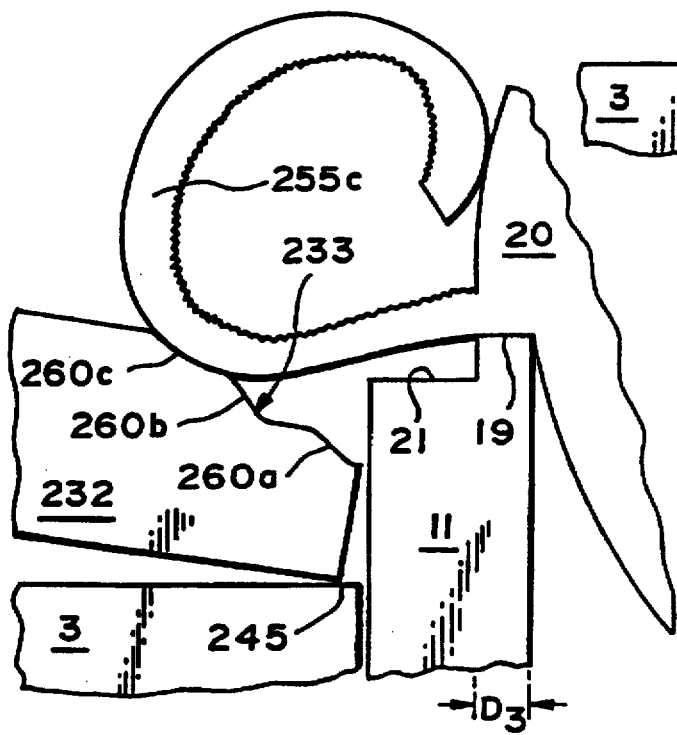

FIGS. 13A and 13B are side cross-sectional views of the metal cutting tool assembly of FIG. 12 along the lines 13A,B—13A,B, illustrating how metal chips of different thicknesses deflect the leaf spring of this mounting mechanism to different extents, thereby adjusting the chipbreaking groove, and FIGS. 14A, 14B and 14C are enlargements of the surface of the chipbreaker of the seventh embodiment of the invention, illustrating how the pivotal movement afforded by the leaf spring mounting mechanism causes chips of different thicknesses to engage different portions of the surface of the chipbreaker.

DETAILED DESCRIPTION OF THE PREFERRED EMBODIMENT

With reference now to FIGS. 1, 2A, and 2B, the improved metal cutting tool assembly 1 of the invention generally comprises a tool holder 3 having a proximal end 4 which is ultimately connected to an insert driver 5 (shown schematically), and a tapered, distal end 7 having a recess 9 for receiving a cutting insert 11. In each of the preferred embodiments of the invention 1, the cutting insert 11 has a flat body 13 that is generally complimentary in shape to the recess of the tool holder 3 that receives it. A bore 15 is included on the flank surface 16 of the insert 11 for receiving a mounting screw 17 that secures the insert 11 into the recess 9 of the tool holder 3. Alternatively, a KL or LP series toolholder locking pin manufactured by Kennametal Inc. of Latrobe, Pa., may be substituted for the mounting screw 17. The upper side of the insert 11 includes edge 19 for engaging and cutting a rotating workpiece 20 in the manner illustrated in FIGS. 2A and 2B. The cutting edge 19 is flanked by a chip guide land 21 whose purpose is to guide metal chips created by the cutting edge 19 into a chipbreaker. To protract the useful life of the insert 11, an additional cutting edge (not shown) may be provided on the lower end of the insert for use when the upper end edge 19 wears out.

In all of the preferred embodiments, the cutting insert 11 is manufactured from a hard, wear-resistant material. Refractory coated cemented carbide materials, such as KC850®, KC950®, or KC990® grade materials may be used. Ceramic materials, such as Kyon 4000, may also be used.

KC850® is a trademark of Kennametal, Inc., representing a coated carbide grade having a TiC/TiCN/TiN coating over a substrate. An outer layer of the C porosity carbide substrate is enriched with cobalt. Further details of the coating arrangement are available in U.S. Pat. No. 4,035,541 entitled "Sintered Cemented Carbide Body Coated With Three Layers," by Smith et al, issued Jul. 12, 1977, and assigned to the assignee herein.

KC950® is a trademark of Kennametal, Inc., representing a ceramic-coated carbide grade of a TiC/Al$_2$O$_3$/TiN coating over a substrate. An outer layer of the carbide substrate is cobalt enriched. Further details regarding this material are available in U.S. Pat. No. 4,610,931 entitled "Preferentially Binder Enriched Cemented Carbide Bodies And Method Of Manufacture," by Nemeth et al, issued Sep. 9, 1986, and assigned to the assignee herein. Details of both the KC850® and KC950® are further discussed in the Kennametal advertisement entitled, "Chip Control Inserts," published in 1985 as publication number MM8507.

KC990® is a trademark of Kennametal, Inc. representing a multilayered coated carbide grade having a TiCN/Al$_2$O$_3$/TiN coating over a substrate. Details of the composition of this material are available in U.S. Pat. No. 4,984,940, entitled "Multilayer Coated Cemented Carbide Cutting Insert," by Bryant et al, issued Jan. 15, 1991, and assigned to the assignee herein. KC990® is further described, along with the applications for cutting inserts made of KC950® and KC990®, in the Kennametal advertisement entitled "New KC990 Multicoded Grade . . . So Advanced It Will Take Your Productivity Beyond The Next Decade," published in 1989 as publication number A89-45(25)C9.

Pages 284 through 291 of the Kennametal catalogue entitled "Kennametal/85 Metal Cutting Tools For Greater Productivity," published in 1984 as publication number A84-18(140)J4 provide further details of KC850® and KC950®, including applications for cutting inserts made of these materials.

Kyon® 4000 is a trademark of Kennametal, Inc., representing a material of ceramic composition containing about 1.5% silicon carbide whiskers, about 10% zirconia, of which at least about 60 to 70% is in the form of tetragonal zirconia, and with or without minor amounts (e.g. about 0.55%) of magnesia additions, and all dispersed in an alumina matrix. Further information about Kyon® 4000 type cutting inserts can be found in U.S. Pat. Nos. 4,959,331 and 4,959,332 and U.S. Pat. No. 5,141,367 by inventors Beeghly et al, issued on Aug. 25, 1991, and assigned to the assignee herein.

All the U.S. patents and publications cited above are hereby incorporated by reference into this document.

Immediately disposed behind the guide land 21 of the insert 11 is a chipbreaker 23 having a generally rectangular body 25 flanked by at least one tapered chipbreaking surface 27. The chipbreaker 23 is rendered automatically adjustable by means of a mounting mechanism 30, which slidably and reciprocally mounts the body 25 of the chipbreaker 23 over the upper surface 32 of the distal end 7 of the tool holder 3. The mounting mechanism 30 includes a mounting screw 34 having a threaded end 36 which is screwed into a bore 38 in the tool holder body. The upper end of the mounting screw 34 includes a cylindrical shank 40 which freely passes through a slot 42 formed in the center of the body 25 of the chipbreaker 23. The head 43 of the mounting screw 34 closely overlies the top surface 44 of a recess in the chipbreaker body 25 to secure the chipbreaker 23 onto the tool holder 3. A stop block 45 is disposed behind the chipbreaker body 25 in order to limit the extent that the chipbreaker body 25 can move reciprocally away from the cutting edge 19. A pair of mounting screws 46a,b secures the stop block 45 onto the tool holder 3. A pair of rails 47a,b are integrally formed with the stop block and slidably guide the sides of the chipbreaker body 25 as shown. A bore 48 is disposed in the center portion of the stop block 45 for housing a compression spring 50. Spring 50 preferably has linear compression characteristics, and biases the front end of the chipbreaker body 25 toward recess 54 in the insert 11.

The operation of the mounting mechanism 30 in automatically adjusting the chipbreaking groove formed between the chipbreaker 23 and the guide land 21 is best understood with reference to FIGS. 2A and 2B. When the insert driver 5 applies only a relatively light engagement force between the cutting edge 19 of the insert 11 and a turning workpiece 20, only relatively thin metal chips 55 are produced. These thin chips 55 travel across the chip guide land 21 of the insert 11 where they immediately engage the chipbreaking surface 27 of the chipbreaker 25. The force that the relatively thin chips 55 apply to the chipbreaking surface 27 of the chipbreaker 23 is not sufficient to overcome the biasing force of the spring 50. This allows the tapered end of the chipbreaker body 25 to directly engage the recess 54 in the insert 19, which in turn creates a relatively short chipbreaking groove defined by the guide land 19 of the insert 11 and the lower tapered portion of the chipbreaking surface 27. However, when thicker chips 56 are produced as is shown in FIG. 2B, the amount of force that such chips 56 apply to the chipbreaking surface 27 is large enough to overcome some or all of the biasing force of the compression spring 50, thereby sliding the chipbreaker body 25 back toward the stop block 45. The lower tapered end of the chipbreaking surface 27 moves away from the cutting edge of the insert 11, which in turn lengthens the chipbreaking groove defined between the guide land 21, and the chipbreaking surface 27. Thus the reciprocating, resilient action afforded to the chipbreaker 23 by the mounting mechanism 30 allows the chipbreaker 23 to successively break metal chips of widely differing thicknesses by providing a relatively shorter groove which is effective in breaking thin metal chips 55, and a relatively longer groove is effective for breaking thicker chips 56.

FIGS. 3, 4A and 4B illustrate a second embodiment of the tool assembly 1 of the invention. Like the previously described embodiment, this second embodiment includes a chipbreaker 57 including a generally rectangular body 58 having at least one tapered side portion that defines a chipbreaking surface 59. However, the mounting assembly 60 of this particular embodiment lengthens the chipbreaking groove by allowing the chipbreaker 57 to reciprocate vertically, instead of horizontally. To this end, the mounting assembly 60 of the second embodiment includes a recess 62 which may be square on the upper face of the distal end 7 of the tool holder 3 for slidably receiving the shank 64 of a chipbreaker support member 66. The chipbreaker support member 66 includes a support platform 68 for supporting the chipbreaker body 58. The mounting mechanism 60 further includes a mounting screw 70 having a threaded end 72 (shown largely in phantom) whose distal end is screwed into a threaded bore 74 located in the distal end 7 of the tool holder 3. A spring 75 freely circumscribes the central portion of the mounting screw 70. The bottom portion of the spring 75 is freely received within an enlargement of the threaded bore 74, while the upper end of the spring 75 is received within an annular recess disposed in the bottom wall of the shank 64 of the chipbreaker support member 66. The upper end of the screw 70 includes a cylindrical shank 76 which freely and slidably extends through a bore 78 present in the upper portion of the chipbreaker support member 66 and also present in the chipbreaker body 58. The head 80 of the mounting screw 70 retains both the chipbreaker body 58 and the chipbreaker support member 66 in the tool holder 3, and defines the upward stop with respect to the vertical movement of the chipbreaker body 58, while the bottom surface of the square recess 62 in the tool holder body 3 defines the downward stop for movement of the chipbreaker body 58 and chipbreaker support member 66.

The operation of the second embodiment of the invention 1 is best understood with respect to FIGS. 4A and 4B. When the force applied by the insert driver 5 is relatively light, the metal chips 84 generated by the cutting edge 19 of the insert 11 are relatively thin. The force that such thin chips 84 apply against the chipbreaking surface 59 of the chipbreaker 57 is not sufficient to overcome the biasing force of the spring 75. However, when the force applied by the insert driver 5 is increased such that the resulting chips 86 are thicker, these thicker chips 86 apply a force to the chipbreaker surface 59 which overcomes the biasing force of the spring 75, and causes the chipbreaker body 58 to move downwardly as shown in FIG. 4B. This downward movement increases the length of the chipbreaking groove defined between the guide land 21 and the chipbreaking surface 59 since the chip 86 engages a higher portion of the surface 59. Hence, the second embodiment of the invention 1 is capable of successfully breaking metal chips having a wide variety of thicknesses.

FIGS. 5, 6A and 6B illustrate a third embodiment of the metal cutting tool assembly 1 of the invention which likewise includes a chipbreaker 87 having a generally rectangular body 88 flanked by at least one tapered side that defines a chipbreaking surface 89. Like the previously described mounting mechanism 60 described with respect to the second embodiment, mounting mechanism 90 allows the chipbreaker body 88 to vertically and resiliently reciprocate in response to the engagement forces applied to the chipbreaker surface 89 by thinner or thicker metal chips. However, this mechanical action is achieved by means of a substantially different structure.

Specifically, the mounting mechanism 90 includes a support member 92 having a platform 94 which is vertically movable within a complimentarily shaped rectangular recess 96. The bottom of the platform 94 includes at least two guide pins 98a,b which are slidably movable within a pair of vertically oriented bores 100a,b. Both the chipbreaker body 88 and the support member 92 are movably mounted within the rectangular recess 96 by means of a mounting screw 102. Screw 102 includes a threaded end 104 screwed into a threaded bore 106 located in the distal end 7 of the tool holder 3. A spring 107 freely circumscribes the central portion of the screw 102 and is housed within an enlargement of the bore 104. The spring 107 is dimensioned so that it becomes compressed when mounted in the position shown in FIG. 6A, and applies an upward directed biasing force to the underside of the platform 94 of the support member 92. The upper portion of the machine screw 102 includes a cylindrical shank 108 which freely and slidably extends through a bore 110 in both the platform 94, and the chipbreaker body 88. The head 112 of the machine screw 102 retains both the support member 92 and chip breaker body 88 in the rectangular recess 96 of the tool holder 3, and further defines an upward stop for the vertical movement of the chipbreaker body 88. The bottom surface of the rectangular recess 96 defines the downward stop for the vertical movement of the chipbreaker body 88.

In operation, when the insert driver 5 applies a light force to the tool holder 3 such that the cutting edge 19 of the insert 11 makes only shallow cuts in the turning workpiece 20, relatively thin chips 118 are created. These thin chips 118 slide across the guide land 21 and ultimately engage the chip breaking surface 89 of the chipbreaker 87. The chipbreaking groove defined between the guide land 21 and the chipbreaking surface 89 in the position shown in FIG. 6A is dimensioned so that it effectively work hardens and breaks off of thin chips 118. However, if the force applied by the insert driver 5 onto the tool holder 3 is increased such that relatively thick chips 120, such as those shown in FIG. 6B, are formed, the downward force that such chips 120 apply to the surface 89 of the chipbreaker 87 causes the chipbreaker 87 to overcome the bias of the spring 107 until the bottom surface of the platform 94 engages the upper surface of the rectangular recess 96. Such mechanical action lengthens the chipbreaking groove defined between the guide land 21 and the chipbreaking surface 89 by causing the relatively thicker chips 120 to engage a higher point on the chipbreaker surface 89. The relatively longer chipbreaking groove defined by these surfaces is dimensioned to effectively work harden, curl and break the relatively thicker chips 120. Thus, the third embodiment of the invention is capable of breaking metal chips of widely varying thicknesses.

FIGS. 7, 8A and 8B illustrate a fourth embodiment of the metal cutting tool assembly of the invention. This embodiment likewise includes a chipbreaker 122 having a generally rectangular body 123 flanked by at least one tapered portion defining a chipbreaking surface 124. However, the mounting mechanism 125 of this embodiment affords a pivoting, rather than reciprocating, motion to the chipbreaker 122.

The mounting mechanism 125 is disposed over the upper surface 127 of a rectangular recess 129 located on the distal end 7 of the tool holder 3 as shown. The mounting mechanism 125 includes a pivotally movable support member 131 having a support platform 132 for supporting the chipbreaker body 123. The back end of the platform 132 includes a fulcrum member 133, while the front end of the platform 132 is a free end capable of pivoting movement. A pair of mounting screws 136a,b secure the chipbreaker body 123 to the platform 133 of the support member 131. The mounting mechanism 125 further includes another relatively longer mounting screw 137 having a threaded end 139 screwed into a bore 141 located within the tool holder 3. A spring 142 circumscribes the central portion of the machine screw 137, and is housed in and freely movable within an enlargement of the bore 141. The spring 142 applies an upward directed biasing force to the underside of the platform 132 of the pivotally movable support member 131. The upper end of the screw 137 includes a cylindrical shank 143 which freely extends through a bore 145 that extends both through the platform 132 and a central portion of the chipbreaker body 123. The head 147 of the mounting screw 137 retains the chipbreaker body 123 and pivotally movable support member 131 within the rectangular recess 129, and further functions as a stop that defines the upward extend of movement of the chipbreaker body 123 with respect to the tool holder 3. The portion 149 of the bottom surface of the rectangular recess 129 adjacent to the insert 11 functions as a stop that defines the lowermost limit of movement of the free end 135 of the pivotally movable support member 131.

The operation of the fourth embodiment of the invention may best be understood with respect to FIGS. 8A and 8B. When the insert driver 5 applies a light force to the tool holder 3 such that the cutting edge 19 of the insert 11 cuts only thin chips 151 from the turning workpiece 20, the force that such thin chips 151 apply to the chipbreaking surface 124 is insufficient to overcome the biasing force applied to the chipbreaker body by the spring 142. Accordingly, the thin chips 151 engages a chipbreaking groove defined by the guide land 121 of the insert 11 and a lower portion 152 of the chipbreaking surface 124. However, if the engagement force applied by the insert driver 5 is increased so that the cutting edge 19 of the insert 11 creates thicker chips 153 as shown in FIG. 8B, the force that such chips 153 apply to the chipbreaking surface 124 is sufficiently great to overcome the biasing force of the spring 142, and to cause the free end 135 of the pivotally movable support member 131 to pivot into the position shown. Such a movement lengthens the chipbreaking groove defined between the guide land 121 and the chipbreaking surface 124 by causing the chips 153 to engage a higher portion 154 of chipbreaking surface 124. As a shorter groove is effective for breaking thinner chips 151, and a longer groove is effective in breaking thicker chips 153, the embodiment of the invention illustrated in FIGS. 7, 8A and 8B is capable of breaking of metal chips of widely varying thicknesses.

A fifth embodiment of the metal cutting tool assembly of the invention is illustrated in FIGS. 8, 9A, 9B and 9C. This embodiment of the invention likewise includes a chipbreaker 156 having a generally rectangular body 157 flanked by at least one tapered side portion that defines a chipbreaking surface 158. The mounting mechanism 160 of this embodiment, like the previously described mounting mechanism of 125 of the fourth embodiment, allows for a pivoting movement of the chipbreaking surface 158. However, the structure by which such movement is attained is different.

The mounting mechanism 160 of the fifth embodiment is disposed over the upper surface 162 of a rectangular recess 164 provided in the distal end 7 of the tool holder 3. The mechanism 160 includes a pivotally mounted support member 166 having a support platform 168 for supporting the chipbreaker body 157. A dovetail joint 170 pivotally mounts the support platform 168 to a shoulder provided at the distal end 7 of the tool holder 3. The opposing end of the support platform 168 includes a pivotally movable free end 172. Mounting mechanism 160 includes a pair of guide screws 174 for guiding the motion of the chipbreaker body 157 and support platform 168, and for further providing a stop that limits the upward movement of the chipbreaker body 157. Each of the guide screws 174a,b is best seen in FIG. 9A, and includes a threaded end 176 screwed into a bore 177 extending down from the upper surface 162 of the rectangular recess 164. The upper end of each guide screws 174a,b includes a cylindrical shank 178 which freely passes through a bore 179 that extends both through support platform 168, and the chipbreaker body 157. Each of the guide screws 174a,b includes a head 180 which, as indicated earlier, defines the upward limit of pivotal movement of the chipbreaker body 157.

With reference to now to FIGS. 9B and 9C, the chipbreaker body 157 is secured onto the support platform 168 by means of a mounting screw 183. A bore 185 is provided in the tool holder 3 between the two guide screws 174a,b for freely housing a spring 187. The spring 187 is dimensioned such that it constantly applies an upward-directed biasing force to the support platform 168.

The operation of the fifth embodiment of the tool assembly 1 is best understood with respect to FIGS. 9B and 9C. As was the case with the fourth embodiment illustrated in FIGS. 7, 8A and 8B, thin chips 188 do not overcome the biasing force applied by the spring 187 thereby contacting the lower portion 189 of the chipbreaking surface 158, while relatively thick chips 190 do, which in turn causes a pivoting movement of the free end 172 of the platform 168. As such pivoting movements tends to lengthen the chipbreaking groove defined by the guide land 21 in the chipbreaking surface 158, this embodiment of the invention is capable of curling, work hardening and breaking chips having widely varying thickness for the same reasons given with respect to the fourth embodiment of the invention.

FIGS. 10, 11A and 11B illustrate a sixth embodiment of the invention that likewise includes a chipbreaker 191 having a generally rectangular body 192 that includes one tapered side portion that defines a chipbreaking surface 193. Like the previously discussed fourth and fifth embodiments, this embodiment includes a mounting mechanism 195 that allows the chipbreaker body 192 to pivotally move when chips of beyond a certain thickness engage the chipbreaking surface 193. The mounting mechanism 195 is disposed over the upper surface 197 of a rectangular recess 199 in the distal end 7 of the tool holder 3. The mounting mechanism 195 includes a pivotally mounted support member 201 having a support platform 203. The platform 203 supports a chipbreaker 191 whose body 192 is mounted thereto by means of a mounting screw 204. The back end of the support member 201 is movably mounted onto the tool holder 3 by means of a pivotal coupling 206, while the front of the support member 201 includes a free end 207 that pivots in the manner illustrated in FIGS. 11A and 11B.

The pivotal coupling 206 includes a shaft 209 that is integrally formed on the back end of the support member 201. The shaft 209 is slidably receivable within a bore 211 formed in an upper portion of the tool holder 3. The bore 211 includes a slot 213 that is shown. In order to prevent the shaft 209 from sliding out of the bore 211, an annular recess 215 and set screw 217 are provided in a center portion of the bore 211. The distal end of the set screw 217 is disposed within the annular recess 215 as shown in order to prevent the shaft 209 from sliding out of the bore 211. The upper surface 219 of the slot 213 defines an upper stop that limits the upper pivotal movement of the support member 201. A portion 221 of the upper surface 197 of the rectangular recess 199 adjacent to the insert 11 defines a lower stop for the support member 201. A bore 223 is provided in the tool holder 3 for housing a spring 224 which continuously applies an upward biasing force to the support platform 203.

The operation of the sixth embodiment of the invention may best be understood with respect to FIGS. 11A and 11B. As this operation is essentially identical to the operation of both the fourth and fifth embodiments previously described, no further discussion on this aspect of the invention is deemed necessary.

FIGS. 12, 13A and 13B illustrate a seventh embodiment of the metal cutting tool assembly 1 of the invention. This embodiment, like all the others, includes a chipbreaker 231 having a body 232 including a tapered side portion that defines a chipbreaking surface 223. However, the mounting mechanism 235 of this embodiment is substantially different from previously described mounting mechanisms. The mechanism 235 is mounted over the upper surface of 237 of a rectangular recess 239 as shown. The mechanism 235 further includes a support platform 241 onto which the chipbreaker body 232 is secured by means of a mounting screw 243. However, in lieu of a pivotal mounting arrangement, the back end of the support platform 241 is cantilevered over the rectangular recess 239 by means of a leaf spring 245. The front end of the platform 241 is free as shown. As was the case with the fifth and sixth embodiments, a lower mechanical stop is defined by a portion 249 of the upper surface 237 of the rectangular recess 239 adjacent to the insert 11. If desired, a section of elastomeric foam 251 (shown in phantom) or other resilient material may be disposed in the space between the underside of the support platform 241 and the upper surface 237 of the rectangular recess 239 in order to reinforce the strength of the leaf spring 245.

The operation of the seventh embodiment of the invention is generally illustrated in FIGS. 13A and 13B. Thin chips 255A apply a small downward force to the chipbreaking surface 233 of the chipbreaker 231, causing little or no deflection in the leaf spring 245 of the mounting mechanism 235. However, relatively thick chips 255c provide stronger downward forces onto the chipbreaker 231 which can cause the leaf spring 235 to deflect to its maximum extent, as is illustrated in FIG. 13B. Such a deflection lengthens the chipbreaking groove defined by the combination of the guide land 21 and the chipbreaking surface 233 which is, of course, more effective for curling, work hardening and breaking thicker chips 255c.

FIGS. 14A, 14B and 14C illustrate in greater detail how the chipbreaking groove defined between the guide land 21 and the chipbreaking surface 233 lengthens as chips of greater thickness engage the chipbreaking surface 233. As shown in FIG. 14A, the relatively thin chip 255a does not apply sufficient force to cause any significant deflection of the leaf spring 245. Accordingly, such thin chips 255a slide over the guide land and into a first, lower portion 260a of the chipbreaking surface 233. However, when a thicker chip 255b is produced by the cutting edge 19 of the insert 11 as shown in FIG. 14B, the downward directed forces that the chip 255b applies to the chipbreaker 231 are increased, which in turn causes a higher degree of deflection of leaf spring 245. Consequently, such chips 255b of medium thickness engage a central portion 260b of the chipbreaking surface 233 of chipbreaker 231. Finally, when relatively thick chips 255c are produced by the cutting edge 19 of the insert 11, the forces applied to the chipbreaker 231 are sufficient to cause a maximum deflection of the leaf spring 245, wherein the free end 247 of the support platform 241 comes into contact with surface 245. Such movement in turn causes the thick chip 255c to slide over the guide land 221 and engage the most distant portion 260c of the chipbreaking surface 233, which has the affect of extending the chipbreaking groove defined between these two surfaces to a maximum extent.

While the ability of the mounting mechanism to portion its respective chipbreaker into an intermediate position suitable for breaking chips of intermediate thickness has only been described in detail with respect to the seventh embodiment of the invention, all of the other embodiments of the invention also have this ability. Various other modifications, changes, and variations of the invention will become apparent to persons of skill in the art. All such modifications, changes, and variations are intended to be encompassed within the scope of this invention, which is limited only the claims appended hereto.

What is claimed is:

1. An improved metal cutting tool assembly of the type including a cutting insert having an edge for cutting a relatively rotating workpiece, an insert driver for applying a cutting force between said insert and said workpiece, and a holder for supporting the insert, said holder being connected to the insert driver, wherein metal chips slide off said insert along a common direction during a cutting operation, and wherein the improvement comprises:

a chipbreaking means for breaking metal chips created during a cutting operation, said chipbreaking means having a chipbreaking surface for breaking chips of different thicknesses when positioned at different distances from the cutting edge of the insert, and a mounting means for movably mounting said chipbreaking means onto said holder, including resilient means for automatically adjusting the distance of said chipbreaking surface with respect to said cutting edge in response to the thickness of the chips produced by said insert such that said surface breaks said chips, said distance being in a direction substantially orthogonal with respect to said direction that said chips slide off of said insert.

2. The improved metal cutting tool assembly of claim 1, wherein chips of different thicknesses apply different forces onto the chipbreaker means, and said resilient means deflects in proportion to the amount of force said chips apply to said chipbreaker means to move said chipbreaking surface farther from said cutting edge for thicker chips, and closer to said cutting edge for thinner chips.

3. The improved metal cutting tool assembly of claim 2, wherein said mounting means includes means for slidably mounting said chipbreaking means onto said holder such that said chipbreaking surface is reciprocally movable with respect to said cutting edge of said insert in a direction orthogonal to said direction that said chips slide off of said insert.

4. The improved metal cutting tool assembly of claim 3, wherein said resilient means is a assembly of claim 3, wherein said resilient means is a coil spring with substantially linear compression characteristics.

5. An improved metal cutting tool assembly of the type including a cutting insert for cutting a relatively rotating workpiece, an insert driver for applying a cutting force between the insert and the workpiece, and a holder for supporting the insert, said holder being connected to the insert driver, wherein metal chips slide off said insert along a common direction during a cutting operation, and wherein the improvement comprises:

a chipbreaking means for breaking metal chips created during a cutting operation, said chipbreaking means having a chipbreaking surface for breaking chips of different thicknesses when positioned at different distances with respect to the cutting edge of said insert, said distance being in a direction substantially orthogonal with respect to said direction that said chips slide off of said insert, and a mounting means for movably mounting said chipbreaking means onto said holder, including resilient means for automatically adjusting the distance of said chipbreaking surface with respect to said cutting edge in response to the thickness of chips produced by the insert, wherein chips of different thicknesses apply different forces onto the chipbreaker means, and said resilient means deflects in proportion to an amount of force applied to said chipbreaker means by said chips to move said chipbreaking surface farther from said cutting edge for thicker chips, and closer for thinner chips.

6. The improved metal cutting tool assembly of claim 5, wherein said mounting means includes means for slidably mounting said chipbreaking means onto said holder such that said chipbreaking surface is reciprocally movable with respect to said cutting edge of said insert in a direction orthogonal to said direction that said chips slide off of said insert, and wherein said resilient means is a coil spring having substantially linear compression characteristics such that thicker chips compress said coil spring to greater extents.

7. The improved metal cutting tool assembly of claim 6, wherein said mounting means includes a guide means disposed in said holder for guiding said chipbreaking means along said reciprocating movement.

8. The improved metal cutting tool assembly of claim 7, wherein said guide means is a shank mounted on the chipbreaking means having a square cross-section that is slidably movable within a complementarily shaped square recess in said holder.

9. The improved metal cutting tool assembly of claim 7, wherein said guide means is a plurality of guide pins mounted on the chipbreaking means that are slidably movable within complementarily shaped bores in the holder.

10. An improved metal cutting tool assembly of the type including a cutting insert having an edge for cutting a relatively rotating workpiece, an insert driver for applying a cutting force between said insert and said workpiece, and a holder for supporting the insert, said holder being connected to the insert driver, wherein metal chips slide off said insert along a common direction during a cutting operation, and wherein the improvement comprises:

a chipbreaking means for breaking metal chips created during a cutting operation, said chipbreaking means having a chipbreaking surface for breaking chips of different thicknesses when positioned at different distances from the cutting edge of the insert, and a mounting means for movably mounting said chipbreaking means onto said holder, including resilient means for automatically adjusting the distance of said chipbreaking surface with respect to said cutting edge in response to the thickness of the chips produced by said insert such that said surface breaks said chips, said distance being in a direction substantially orthogonal to the direction said chips slide off of said insert.

* * * * *